(12) United States Patent
Ochrombel et al.

(10) Patent No.: US 9,274,350 B2
(45) Date of Patent: Mar. 1, 2016

(54) OPHTHALMIC LENS COMPRISING A UNIQUE LENS IDENTIFICATION CODE

(71) Applicant: Novartis AG, Basel (CH)

(72) Inventors: Rene Ochrombel, Bergheim (DE); Jochen Koehler, Nierstein (DE); Dieter Zahn, Grossostheim (DE); Roger Biel, Aschaffenburg (DE)

(73) Assignee: NOVARTIS AG (CH)

( * ) Notice: Subject to any disclaimer, the term of this patent is extended or adjusted under 35 U.S.C. 154(b) by 0 days.

(21) Appl. No.: 14/102,970

(22) Filed: Dec. 11, 2013

(65) Prior Publication Data

US 2014/0168600 A1 Jun. 19, 2014

Related U.S. Application Data

(60) Provisional application No. 61/737,362, filed on Dec. 14, 2012.

(51) Int. Cl.
 *G02C 7/02* (2006.01)
 *G02C 7/04* (2006.01)
 *B29D 11/00* (2006.01)

(52) U.S. Cl.
 CPC .......... *G02C 7/021* (2013.01); *B29D 11/00326* (2013.01); *G02C 7/024* (2013.01); *G02C 7/04* (2013.01)

(58) Field of Classification Search
 CPC ............. G02C 7/021; B29D 11/00317; B29D 11/00326; B29D 11/00336; B29D 11/00346
 USPC .................................................... 351/159.69
 See application file for complete search history.

(56) References Cited

U.S. PATENT DOCUMENTS

| 4,194,814 | A | | 3/1980 | Fischer |
| 4,939,354 | A | * | 7/1990 | Priddy et al. ................. 235/456 |
| 6,188,040 | B1 | | 2/2001 | Darmes |
| 2002/0003605 | A1 | * | 1/2002 | Rogers et al. ............ 351/160 R |
| 2006/0001828 | A1 | | 1/2006 | Duggan |
| 2010/0246005 | A1 | * | 9/2010 | Moon et al. .................. 359/569 |
| 2011/0089585 | A1 | * | 4/2011 | Biel et al. ...................... 264/1.1 |

FOREIGN PATENT DOCUMENTS

WO 2011045376 A1 4/2011

OTHER PUBLICATIONS

PCT International Search Report dated Mar. 18, 2014, International Application No. PCT/EP2013/076247, International Filing Date Dec. 11, 2013.
PCT Written Opinion of the International Searching Authority dated Mar. 18, 2014, International Application No. PCT/EP2013/076247, International Filing Date Dec. 11, 2013.

* cited by examiner

*Primary Examiner* — Jordan Schwartz
(74) *Attorney, Agent, or Firm* — Robert A. Ambrose

(57) ABSTRACT

An ophthalmic lens (1) has a front surface (2) and a rear surface, each of the front and rear surfaces comprising a central optical zone (4) which is surrounded by a peripheral zone (3). The ophthalmic lens (1) further comprises a unique lens identification code which is arranged in the peripheral zone (3) of one of said front and rear surfaces. The unique lens identification code has the form of an N×M dot matrix (5) comprising N rows and M columns of matrix elements (50), and the N×M dot matrix (5) represents a binary code.

10 Claims, 2 Drawing Sheets

OPHTHALMIC LENS COMPRISING A UNIQUE LENS IDENTIFICATION CODE

The present invention suggests an ophthalmic lens having a front surface and a rear surface, each of the front and rear surfaces comprising a central optical zone which is surrounded by a peripheral zone. The ophthalmic lens further comprises a unique lens identification code being arranged in the peripheral zone of one of said front and rear surfaces. The unique lens identification code has the form of an N×M dot matrix comprising N rows and M columns of matrix elements, the N×M dot matrix representing a binary code.

FIELD

The invention relates to ophthalmic lenses comprising a unique lens identification code, and further relates to a method of manufacturing an ophthalmic lens comprising such unique lens identification code in an automated production line. In particular, these ophthalmic lenses comprise contact lenses such as hard and soft contact lenses.

BACKGROUND

In mass production of soft contact lenses, specifically soft contact lenses which are worn only once and which are disposed of after use, a large number of soft contact lenses must be manufactured in a relatively short period of time. This may be performed with the aid of reusable molds comprising male and female mold halves in a closed-loop production process. Typically, a lens forming material is introduced into one of the male and female mold halves, the mold halve are then assembled to form the mold, and the lens forming material between the molding surfaces of the male and female mold halves is then polymerized and/or cross-linked, to form the lens. After demolding of the lens, the reusable molds are cleaned and dried and are then reused for production of the next lens. Suitable lens forming materials include, but are not limited to, polymers and prepolymers based on polyvinyl alcohols (PVA) or silicone hydrogels (SiHy).

In order to meet the needs of the large number consumers large numbers of contact lenses having different lens parameters must be produced. Such lens parameters include, for example, refractive power, base curve radius, axes of toric lenses, etc. Thus, in order to be able to carry out all incoming orders within a short time large numbers of different types of contact lenses must be produced and held on stock, the different types of contact lenses being distinct from each other in at least one lens parameter. Depending on the incoming orders, lenses of one particular type must be produced in larger numbers than others in order to refill the stock so as to be in a position to carry out all incoming orders within a short time.

In the closed-loop production process, a certain number of contact lenses which may or may not be of different types are produced in one run through the loop, that is to say until the male and female mold halves are re-used again in a further run through the loop. Accordingly, a corresponding number of pairs of male and female mold halves are used in the production line. Each such pair of male and female mold halves used in the production line is called a "lot", so that the number of lots corresponds to the number of pairs of male and female mold halves actually used in the production line. All contact lenses produced in the various loops of the production process with the same pair of male and female molds halves belong to the same lot.

For each contact lens produced, a clear allocation of the contact lens produced to the respective lot is vital for various reasons, and also a mix-up of lots must be avoided. By way of example, in case a problem is reported by a customer with respect to a particular contact lens (a contact lens having a particular set of lens parameters) it is helpful if the corresponding lot can be identified (that pair of male and female mold halves which has been used for the production of the particular contact lens that has caused the problem). Only identifying the lens parameters of the contact lens that has caused the problem is not sufficient, since it is possible that contact lenses having the same lens parameters have been produced on the production line even in the same loop but with different pairs of male and female mold halves. Thus, it is vital that each contact lens can be clearly allocated to the respective lot and also to avoid lot mix-up. In case each contact lens can be allocated to the respective lot, it is possible to check whether the mold halves that have been used for production of the particular contact lens that has caused the problem are in optimum condition. This is even more important in case a problem reoccurs within the same lot.

For a clear allocation of a contact lens to a respective lot and in order to avoid lot mix-up, it is already known to apply the lot number to the contact lens in a peripheral portion of the contact lens outside the central optical portion so that application of the lot number is not experienced by the person wearing the contact lens.

It is an object of the invention to provide an improved ophthalmic lens, in particular a contact lens such as a soft contact lens, which comprises additional information applied to the lens. It is a further object of the invention to provide an improved process of manufacturing such ophthalmic lenses in an automated production line.

SUMMARY

The present invention suggests an ophthalmic lens having a concave front surface and a convex rear surface, each of the front and rear surfaces comprising a central optical zone which is surrounded by a peripheral zone. The ophthalmic lens further comprises a unique lens identification code being arranged in the peripheral zone of one of said front and rear surfaces. The unique lens identification code has the form of an N×M dot matrix comprising N rows and M columns of matrix elements, the N×M dot matrix representing a binary code.

Depending on the integer numbers N and M, the binary code represented by the matrix elements of the N×M dot matrix allows to uniquely identify each individual lens rather than only identifying the lot to which the lens belongs. For example, each individual lens is assigned a unique lens identification number, and the unique lens identification code may comprise this unique lens identification number. Since the lens identification code in the form of the N×M dot matrix is unique, each N×M dot matrix differs from any other N×M matrix in at least one matrix element.

The space needed for applying such N×M dot matrix is very small so that it can be easily arranged in the peripheral portion of an ophthalmic lens, in particular of a contact lens such as a soft contact lens. And while the information contained in the binary code, of course, allows for allocation of each individual lens to its lot, additional information may be included in the binary code. By way of example, the binary code may include information concerning the lens manufacturer (so that the unique lens identification code can be used as a security feature), the location where the lens has been manufactured, information on the lens parameters, production year, etc.

The unique lens identification code can be easily read using suitable existing devices. For example, conventional dot-code readers can be used which can be equipped with software allowing for reading of the unique lens identification number with the aid of which additional information on the lens can be retrieved from a database via Internet. Alternatively, it is conceivable to provide a software that can be downloaded by a user to his/her smart-phone so that the camera of the smart-phone can then read the unique lens identification number with the aid of which additional information on the lens can be retrieved via Internet from a database.

In some embodiments of the ophthalmic lens according to the invention, the N×M dot matrix is arranged in the peripheral zone of the front surface of the ophthalmic lens. This allows for an easy manufacturing of the lens according to the invention, as will be explained in more detail below.

In some embodiments of the ophthalmic lens according to the invention, the binary code represented by the N×M dot matrix comprises two types of matrix elements, the two types of matrix elements being dots having a distinct transparency to light. This allows for an easy reading of the unique lens identification code.

In some embodiments of the ophthalmic lens according to the invention, a corner element of the matrix elements of the N×M dot matrix is blank. This allows for an easy determination of whether or not the lens is inverted in a lens inspection station of the production line.

In some embodiments of the ophthalmic lens according to the invention, the matrix elements of at least one of the uppermost or lowermost rows and of the outermost left or outermost right columns of said N×M dot matrix represent a check sum for the remaining matrix elements of the respective column or row. This allows to some extent for reconstruction of matrix elements should they get damaged.

Another aspect of the invention relates to a method of manufacturing of ophthalmic lenses in an automated production line, the method comprising the steps of:

providing a plurality of molds,
introducing a lens forming material into the molds,
transporting the molds through a plurality of manufacturing stations sequentially arranged along the production line to manufacture ophthalmic lenses from the lens forming material, and
applying a unique lens identification code to each ophthalmic lens in a peripheral zone surrounding a central optical zone of the ophthalmic lens,
wherein the step of applying a unique lens identification code to the respective ophthalmic lens in the peripheral zone comprises applying a lens identification code having the form of an N×M dot matrix comprising N rows and M columns of matrix elements, the N×M dot matrix representing a binary code.

The advantages of the method according to the invention are already mentioned above in connection with the ophthalmic lens according to the invention.

In some embodiments of the method according to the invention, the mold comprises male and female mold halves, and the unique lens identification code having the form of the N×M dot matrix is applied to the peripheral zone of a molding surface of the male or female mold half, so that during subsequent manufacture of the ophthalmic lens from the lens forming material the unique lens identification code having the form of the N×M dot matrix is transferred from the peripheral zone of the molding surface of the male or female mold half to the peripheral zone of the rear surface or the front surface of the ophthalmic lens. In some embodiments of the method according to the invention, the unique lens identification code having the form of the N×M dot matrix is applied to the peripheral zone of the molding surface of the female mold half prior to introducing the lens forming material into the female mold half.

The afore-mentioned embodiments are practical embodiments of transferring the lens identification code from the mold (or from a mold half, respectively) to the ophthalmic lens as the lens is formed during lens manufacture.

In some embodiments of the method according to the invention, the unique lens identification code having the form of the N×M dot matrix is applied to the peripheral zone of the molding surface of the mold or of the male or female mold half by applying an ink dot pattern corresponding to the N×M dot matrix to the peripheral zone of the molding surface of the mold or of the male or female mold half and temporarily fixating the applied ink dot pattern to the peripheral zone of the molding surface of the mold or of the male or female mold half, and by transferring the temporarily fixated ink dot pattern from the peripheral zone of the molding surface of the mold or of the male mold half to the peripheral zone of the ophthalmic lens during manufacture of the lens from the lens forming material.

An ink dot pattern is a practical embodiment of the dot matrix, which can be easily applied to the peripheral zone of the molding surface of the mold (or of the male or female mold half, respectively) using commercially available devices.

In some embodiments of the method according to the invention, the ink dot pattern is applied to the peripheral zone of the molding surface of the mold or of the male or female mold half using an ink-jet printer. An ink-jet printer is one particularly suitable device for applying the ink dot pattern to the peripheral zone of the molding surface.

In some embodiments of the method according to the invention, the ink dot pattern is applied in a manner such that two types of ink dots are applied to the peripheral zone of the molding surface of the mold or of the male or female mold half, the two types of ink dots having distinct transparency to light. With the aid of these ink dots having distinct transparency to light it is possible to distinguish between the two values (for example "1" and "0") of the binary code represented by the dot matrix.

In some embodiments of the method according to the invention, the unique lens identification code having the form of the N×M dot matrix is applied such that a corner element of the matrix elements of the N×M matrix is left blank. As already mentioned this allows for an easy determination of whether or not the lens is inverted in a lens inspection station of the production line.

In some embodiments of the method according to the invention, the matrix elements of at least one of the uppermost or lowermost rows and of the outermost left or outermost right columns of said N×M dot matrix represent a check sum for the remaining matrix elements of the respective column or row. This allows to some extent for reconstruction of matrix elements should they get damaged.

Further embodiments and advantages become apparent from the following description of detailed embodiments of the ophthalmic lens according to the invention with the aid of the drawings.

DETAILED DESCRIPTION OF EMBODIMENTS

The following description of an exemplary embodiment of the invention is for illustrative purposes only and is not intended to limit of the scope of the invention.

Figure 1:
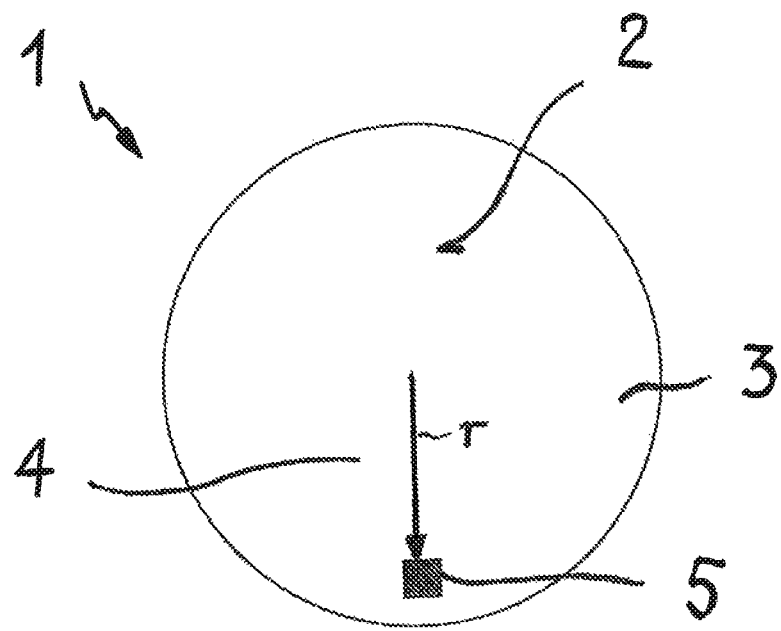
FIG. 1 shows an embodiment of an ophthalmic lens (here: a contact lens) according to the invention contact lens comprising a unique lens identification code in the form of a N×M dot matrix.

FIG. 1 shows an ophthalmic lens in the form of a contact lens 1, for example a soft contact lens in accordance with the invention. The contact lens 1 is shown in a view at its front surface 2. In a peripheral zone 3 of the front surface 2 surrounding a central optical zone of the front surface 2 of the contact lens 1 there is arranged a unique lens identification code having the form of an N×M dot matrix 5 having N rows and M columns of matrix elements (dots). This N×M dot matrix represents a binary code, that is to say a code in which the single matrix elements are of two different types. For example, one type of matrix elements may represent the value "0" while the other type of matrix elements may represent the value "1". By having the N×M dot matrix 5 arranged in the peripheral zone 3 of the contact lens 1, the N×M dot matrix 5 does not affect vision correction which is provided by the central optical zone 4 of the contact lens 1. The radial distance r of the N×M dot matrix 5 from the center of the contact lens 1 may be used to encode the production site where the respective lens.

Figure 2:
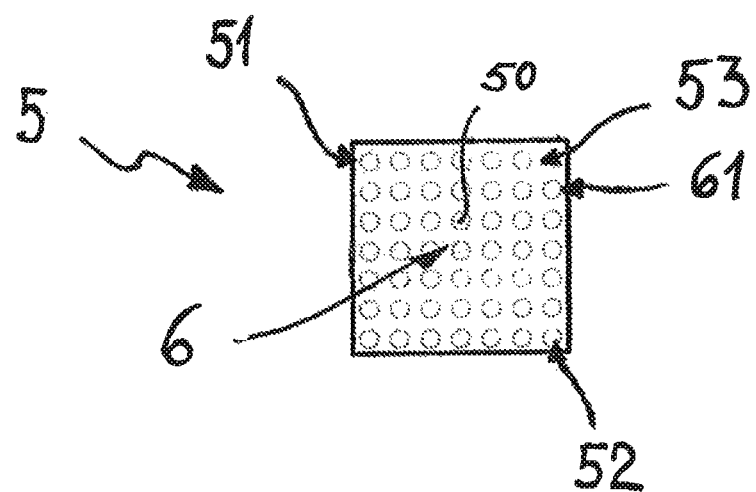
FIG. 2 is an enlarged view of the N×M dot matrix of the lens shown in FIG. 1.

FIG. 2 shows in an enlarged view an embodiment of the N×M dot matrix 5 representing the unique lens identification code. In the embodiment shown, N=7=(6+1) and also M=7=(6+1), so that the N×M dot matrix is a (6+1)×(6+1) dot matrix. The reason why the matrix is designated a "(6+1)×(6+1) matrix" is that one of the rows and one of the columns of the embodiment of the dot matrix shown contains checksum elements which do not carry information about the contact lens 1 but serve a different purpose (reconstruction of matrix elements of the "6×6" matrix carrying information about the contact lens in case of damage), as will be explained further below. It is to be noted, that the N×M dot matrix 5 generally can have an arbitrary number of rows and columns, provided that its size remains small enough to fit into the peripheral zone of the contact lens 1 so that it does not interfere with the central optical zone of the contact lens 1.

The N×M dot matrix 5 shown has a very distinctive configuration. As already indicated above, the uppermost row 51 and the outermost right column 52 of the dot matrix 5 serve a specific reconstruction. A corner element 53 of the matrix elements 50 at a location where the uppermost row 51 and the outermost right column 52 are crossing is blank, that is to say there is no dot representing one of the two binary values representing "0" or "1", respectively. The location of this blank corner element 53 may be used to determine whether the contact lens 1 is in its proper orientation or if it is inverted. If the lens is properly oriented (not inverted), the corner element 53 is located in the upper right corner as shown in FIG. 2. If the lens was inverted the blank corner element 53 would appear at the lower left hand corner instead. This information may be used, for example, in an automatic lens inspection station of a contact lens manufacturing line so as to be able to automatically detect an inverted contact lens and to re-invert such inverted contact lens prior to placing it into a package so as to place only properly oriented contact lenses into the packages. For the skilled person it is evident, that the blank corner element 53 could be located at any corner of the N×M dot matrix 5.

Disregarding the uppermost row and the outermost right column of the (6+1)×(6+1) matrix, a matrix area 6 comprising 6×6 matrix elements is left. For, example, the uppermost row 61 of this matrix area may be reserved for encoding the production year of the respective lens. Since each single matrix element 50 may represent either a value "0" or a value "1", a total number of $2^6$=64 different production years can be encoded in uppermost row 61. The remaining 5×6 matrix elements 50 represent a total of $2^{30}$ different combinations, so that such matrix would allow a total of 1'073'741'823 contact lenses 1 (the contact lens having the number "0" is not counted), that is to say more than one billion contact lenses, to be produced a year with each contact lens 1 having a unique lens identification code, disregarding that this can be performed at each production site, since the production site can be encoded in the radial distance of the matrix from the center of the contact lens 1 (see above). The unique lens information code of each contact lens 1 can be stored in a data base, so that information about each specific contact lens 1 (such as refractive power, base curve radius, axes of toric lenses, male and female mold halves used for production of the contact lens, exact date and time of production, etc.) can be retrieved from the database.

As already mentioned above, the uppermost row 51 and the outermost right column 52 of the (6+1)×(6+1) dot matrix 5 are reserved for reconstruction purposes. For that purpose uppermost row 51 and outermost right column 52 contain coded information about a checksum of each respective column or row column of matrix area 6 (6×6 matrix elements). For example, the outermost left matrix element in uppermost row 51 is a checksum of the six matrix elements of outermost left column of matrix area 6. This checksum may have the value "0" or the value "1", depending on the values of the other matrix elements in the outermost left column of dot matrix 5. For example, if the sum of the matrix elements 50 of the six matrix elements of the outermost left column of matrix area 6 is even, the outermost left matrix element in uppermost row 51 is "0". If the sum of the matrix elements of the six matrix elements of the outermost left column of matrix area 6 is odd, the outermost left matrix element in uppermost row 51 would be "1". Let us now assume that one of the matrix elements 50 in the outermost left column of matrix area 6 gets damaged or corrupted and cannot be identified anymore as being "0" or "1". With the aid of the outermost left matrix element in uppermost row 51 it is then possible to identify that the damaged matrix element 50 must have been "0" or "1". Similar considerations hold for the other matrix elements of the uppermost row 51. In a corresponding manner, with the aid of the matrix elements of the outermost right column 52 it is possible to "reconstruct" damaged matrix elements of the respective row. It is also evident, that the extent to which reconstruction is possible has its limits.

In order to further enhance understanding the above wording is illustrated with an exemplary (6+1)×(6+1) matrix ("1/0" indicating that each matrix element may have a value of either "1" or "0"):

Matrix:

```
1/0  1/0  1/0  1/0  1/0  1/0              → check sum elements (columns)
1/0  1/0  1/0  1/0  1/0  1/0  1/0         → production year
1/0  1/0  1/0  1/0  1/0  1/0  1/0         → lens number
1/0  1/0  1/0  1/0  1/0  1/0  1/0         → lens number
1/0  1/0  1/0  1/0  1/0  1/0  1/0         → lens number
1/0  1/0  1/0  1/0  1/0  1/0  1/0         → lens number
1/0  1/0  1/0  1/0  1/0  1/0  1/0         → lens number
                              ↓
                            check
                             sum
                          elements (rows)
```

As already mentioned, the 6×6 dot matrix (without the uppermost row and the outermost right column) allows to uniquely encode information about the respective lens, for example:

year of production . . . first row of matrix area 6 (see FIG. 2)

lens number . . . remaining five rows and six columns of matrix area 6 lens orientation . . . location of blank corner element 53 (see FIG. 2)

Figure 3:
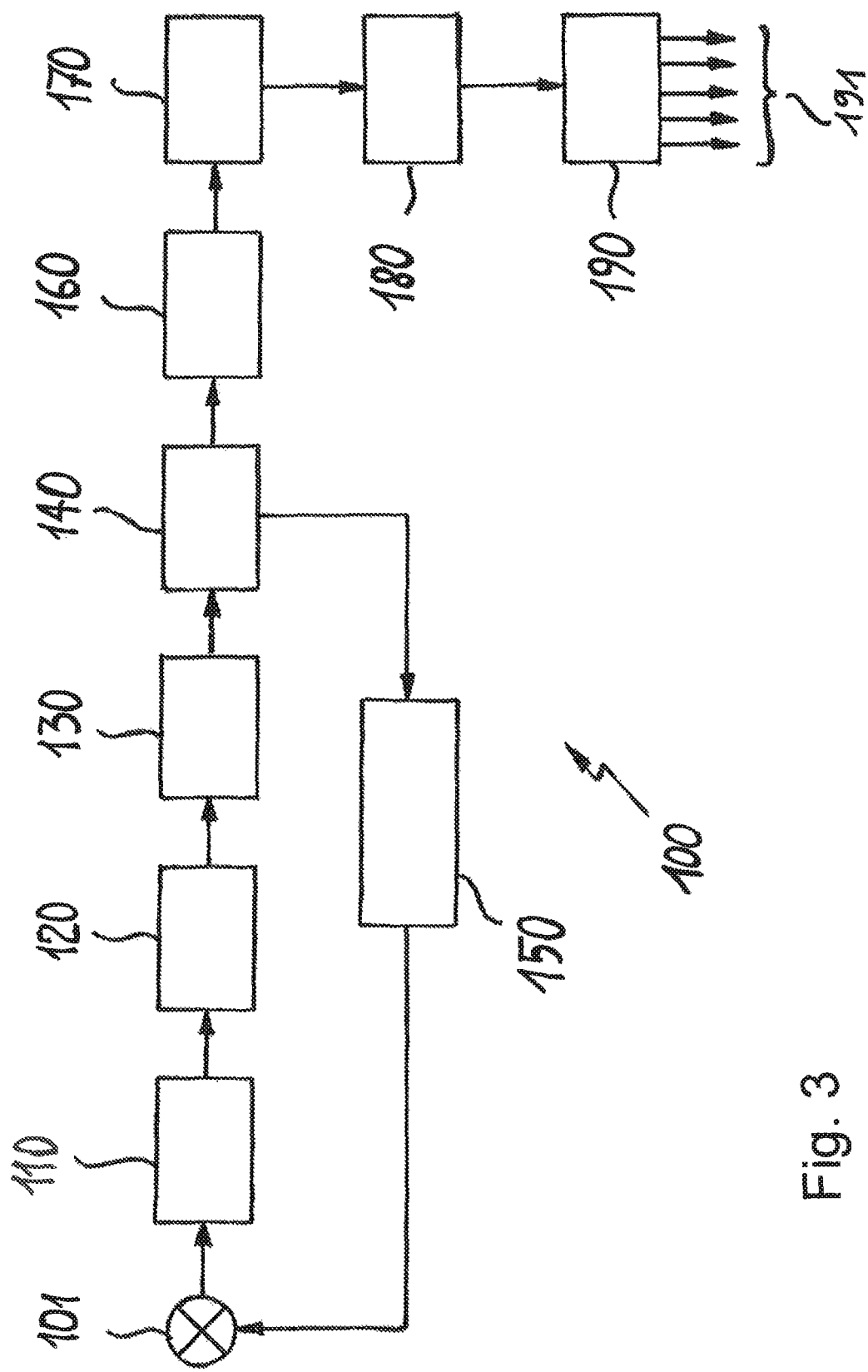
FIG. 3 is a block diagram of a closed cycle production line for the manufacture of contact lenses.

In FIG. 3 some stations of an embodiment of a production line 100 for ophthalmic lenses such as contact lenses, and in particular soft contact lenses, are shown. It is to be noted, that only stations are represented which are necessary for understanding the method according to the invention are shown in FIG. 3. At a starting point 101, typically a plurality of clean molds are starting their travel through the individual stations of the production line 100. Each mold comprises a male mold half and a female mold half having specifically shaped molding surfaces to manufacture a contact lens having specific lens parameters. Before the molds reach a dosing station 120, the molds are transported to an encoding station 110. In the encoding station 110, the unique lens identification code in the form of an N×M dot matrix as described above is applied onto the molding surface of at least one of the male and female mold halves of each mold in a peripheral zone of the molding surface surrounding an optical zone of the respective molding surface. For example, an ink dot pattern corresponding to the respective N×M dot matrix is printed onto the molding surface in the peripheral zone of the respective female mold half with an ink-jet printer. For example, a commercially available UV-hardenable ink suitable for contact lenses can be used for that purpose. Also, an inkjet-printer with a commercially available printing head (e.g. Dimatix Spectra Galaxy 256/50AAA) can be used for applying the ink dot pattern. The so applied ink dot pattern of which is unique for each individual contact lens is then partially hardened by exposure to UV-radiation (not shown) so as to fix the ink dot pattern on the surface of the peripheral zone of the female mold, as this is conventional in the art.

After the individual and unique ink dot pattern (corresponding to the N×M dot matrix) has been applied and fixed to each female mold half in the peripheral zone thereof, the molds are transported to the dosing station 120 in which a predetermined amount of a lens forming material is introduced into the female mold half. The molds are then closed by placing the respective male mold halves onto the respective female mold halves, and the closed molds are transported to a polymerization station 130. In the polymerization station 130, the lens forming material is polymerized and/or cross-linked to form the contact lens. Polymerization and/or cross-linking can be achieved, for example, by exposure of the lens forming material to UV-radiation, as this is well-known in the art. During the polymerization/cross-linking of the lens forming material, the respective unique ink dot pattern is transferred from the peripheral surface of the respective female mold half to the peripheral zone of the respective contact lens, for example the ink dot pattern is embedded in the polymerized/cross-linked lens forming material.

The molds are then opened and the contact lenses each comprising its unique ink dot pattern in the peripheral zone thereof are removed from their respective molds in a contact lens demolding station 140 and are subsequently transferred to a lens inspection station 160. Of course, the respective contact lens may be subjected to various additional treatment steps after having been removed from their respective mold in the demolding station 140 to form the final contact lens, this is not explained herein in detail as such treatment steps are well-known in the art and depend on the respective lens forming material used. The empty molds are transported to a mold cleaning station 150 in which the molds are cleaned so that they can be re-used to form the next contact lens in the manner described above.

As has been discussed in detail above, the ink dot pattern of the N×M dot matrix represents a binary code, so that the individual matrix elements 50 (see FIG. 2) represent two different binary values (e.g. "0" and "1"). This can be achieved by applying two types of ink dots having different transparency to light, and these two types of ink dots can be realized, by way of example, by applying either one single ink droplet (e.g. representing the binary value "0") or more than one ink droplets (e.g. representing the binary value "1") at the location of the respective matrix element. For example, for a binary value "0" a single droplet of ink is printed onto the lens molding surface, while for a binary value "1" a series of droplets, such as for example eight droplets, are printed onto the lens molding surface. As a result, the single droplet representing the binary value "0" may have a height of about 4 µm while the multiple droplets representing the binary value "1" may have an exemplary height of about 12 µm. The diameters of the single and multiple droplets are about the same and may be in the range of about 85 µm to about 120 µm, this being understood to particularly include and disclose the values of the boundaries. It goes without saying that the single droplet representing the binary value "0" has a greater transparency to light than has the droplet formed by the multiple droplets representing the binary value "1", which consequently appears distinctly darker.

Turning back to FIG. 3, the contact lenses each comprising its unique lens identification code are transported to a lens inspection station 160, where each lens is inspected. And while in the lens inspection station 160, of course, the lens is also inspected for various defects, this is not described in detail here since this is conventional in the art. However, in addition thereto the unique lens identification code of each contact lens is read with a suitable device in the inspection station 160, for example with the aid of a CCD-camera. And although the system control of the production line 100 must at any time exactly know which contact lens is at which location in the production line in order to be able to fully control the production process, it can now be double-checked at the inspection station 160 by reading the unique lens identification code whether the contact lens that is supposed to be in the inspection station 160 actually is in the inspection station in any event the correct lens is then inserted into a contact lens package at the packaging station 170. In case the inspection station 160 is embodied so as to be able to measure the optical properties of the contact lens and since the unique lens identification code (via the unique number of the lens) also contains information on the optical properties of the contact lens, it is also possible to double-check whether the optical properties measured in the lens inspection station 160 correspond to the optical properties of the contact lens which are stored in the database for the contact lens having this unique lens number.

Once a contact lens has successfully passed the lens inspection station 160 it is transported to a package station 170 in which every single lens is transferred into a separate lens container which is typically filled with saline solution or any other suitable storage solution. The lens containers are then closed with a sealing foil, as this is conventional in the art, sterilized/autoclaved in a sterilization station 180 and are then forwarded to a storage 190, from where they can be shipped in accordance with orders received, this being is indicated by the arrows 191 in FIG. 3.

The invention has been explained hereinbefore with reference to the manufacture of contact lenses. It is to be noted, that the invention also encompasses the manufacture of other types of ophthalmic lenses, such as, e.g., intraocular lenses, etc. Thus, the term contact lens must not be read as limiting, but it also includes all other types of ophthalmic lenses which may be manufactured in automated manufacture processes such as, e.g., on closed cycle production lines.

The invention claimed is:

1. An ophthalmic lens (1) having a front surface (2) and a rear surface, each of the front and rear surfaces comprising a central optical zone (4) which is surrounded by a peripheral zone (3), the ophthalmic lens (1) further comprising a unique lens identification code being arranged in the peripheral zone (3) of one of said front and rear surfaces, the unique lens identification code having the form of an N×M dot matrix (5) comprising N rows and M columns of matrix elements (50), the N×M dot matrix (5) representing a binary code, and
wherein the binary code represented by the N×M dot matrix (5) comprises two types of matrix elements (50), the two types of matrix elements (50) being two types of ink dots having a distinct transparency to light; and
wherein a corner element (53) of the matrix elements of the N×M dot matrix (5) is blank.

2. The ophthalmic lens according to claim 1, wherein the N×M dot matrix (5) is arranged in the peripheral zone (3) of the front surface (2) of the ophthalmic lens (1).

3. The ophthalmic lens according to claim 1, wherein the matrix elements of at least one of the uppermost (51) or lowermost rows and of the outermost left or outermost right (52) columns of said N×M dot matrix (5) represent a check sum for the remaining matrix elements of the respective column or row.

4. A method of manufacturing of ophthalmic lenses in an automated production line, the method comprising the steps of:
providing a plurality of molds,
introducing a lens forming material into the molds,
transporting the molds through a plurality of manufacturing stations sequentially arranged along the production line to manufacture ophthalmic lenses from the lens forming material, and
applying a unique lens identification code to each ophthalmic lens in a peripheral zone surrounding a central optical zone of the ophthalmic lens,
wherein the step of applying a unique lens identification code to the respective ophthalmic lens in the peripheral zone comprises applying a lens identification code having the form of an N×M dot matrix comprising N rows and M columns of matrix elements, the N×M dot matrix representing a binary code; and
wherein the unique lens identification code having the form of the N×M dot matrix is applied to the male or female mold half by applying an ink dot pattern corresponding to the N×M dot matrix, the ink dot pattern comprising two types of ink dots having distinct transparency to light; and
wherein the unique lens identification code having the form of the N×M dot matrix is applied such that a corner element of the matrix elements of the N×M matrix is left blank.

5. The method according to claim 4, wherein the step of applying the unique lens identification code having the form of the N×M dot matrix to the respective ophthalmic lens in the peripheral zone comprises
applying the unique lens identification code having the form of the N×M dot matrix to a peripheral zone of a molding surface of the mold, and
transferring the unique lens identification code having the form of the N×M dot matrix from the peripheral zone of the molding surface of the mold to the peripheral zone of the ophthalmic lens during manufacture of the ophthalmic lens.

6. The method according to claim 5, wherein the mold comprises male and female mold halves, and wherein the unique lens identification code having the form of the N×M dot matrix is applied to the peripheral zone of a molding surface of the male or female mold half, so that during subsequent manufacture of the ophthalmic lens from the lens forming material the unique lens identification code having the form of the N×M dot matrix is transferred from the peripheral zone of the molding surface of the male or female mold half to the peripheral zone of the rear surface or the front surface of the ophthalmic lens.

7. The method according to claim 6, wherein the unique lens identification code having the form of the N×M dot matrix is applied to the peripheral zone of the molding surface of the female mold half prior to introducing the lens forming material into the female mold half.

8. The method according to claim 6, wherein the unique lens identification code having the form of the N×M dot matrix is applied to the peripheral zone of the male or female mold half by applying the ink dot pattern corresponding to the N×M dot matrix to the peripheral zone of the male or female mold half and temporarily fixating the applied ink dot pattern, and by transferring the temporarily fixated ink dot pattern to the peripheral zone of the ophthalmic lens during manufacture of the lens from the lens forming material.

9. The method according to claim 8, wherein the ink dot pattern is applied to the peripheral zone of the male or female mold half using an ink-jet printer.

10. The method according to claim 4, wherein the matrix elements of at least one of the uppermost or lowermost rows and of the outermost left or outermost right columns of said N×M dot matrix represent a check sum for the remaining matrix elements of the respective column or row.

\* \* \* \* \*